United States Patent [19]
Gerdes

[11] Patent Number: 6,076,934
[45] Date of Patent: Jun. 20, 2000

[54] VEHICLE BLIND SPOT MIRROR

[76] Inventor: Hartmut H. Gerdes, 11 Birdnest Ct., Mill Valley, Calif. 94941

[21] Appl. No.: 09/266,157

[22] Filed: Mar. 11, 1999

[51] Int. Cl.[7] ........................................ G02B 5/08
[52] U.S. Cl. .......................... 359/871; 359/872; 359/850; 359/865; 359/866
[58] Field of Search .................... 359/871, 872, 359/850, 865, 866; 248/467, 495, 496, 497

[56] References Cited

U.S. PATENT DOCUMENTS

| | | | |
|---|---|---|---|
| 3,104,274 | 9/1963 | King | 359/872 |
| 4,486,075 | 12/1984 | Cohen | 359/865 |
| 5,579,133 | 11/1996 | Black et al. | 359/872 |
| 5,691,855 | 11/1997 | Lupkas | 359/866 |

*Primary Examiner*—Cassandra Spyrou
*Assistant Examiner*—Mohammad Y. Sikder
*Attorney, Agent, or Firm*—Jack Lo

[57] ABSTRACT

A vehicle blind spot mirror with a mirror having a single plane outwardly curved surface, an extension member attached to the rear portion of the outwardly curved mirror and having a double stick foam tape attachment means on the opposite surface of the extension, allowing the extension and attached blind spot mirror to be affixed to a vehicle's existing rear view mirror even if the rear view mirror is set in a recessed frame, thereby allowing for a larger blind spot mirror than the original rear view mirror. A preferred embodiment includes wherein said outwardly curved mirror is approximately seven and one half inches wide and five inches tall and is radially curved in such a way that the vertical center axis of said mirror is raised between thirty and eighty thousandths of an inch higher than the right or left edge. An alternate embodiment wherein the outwardly curved mirror is installed in place of a traditional flat plane driver's side rear view mirror found in current motor vehicles.

3 Claims, 3 Drawing Sheets

VEHICLE BLIND SPOT MIRROR

BACKGROUND OF THE INVENTION

This invention relates generally to the field of rear view mirrors for motor vehicles, and more particularly to a vehicle blind spot mirror.

Very soon after the invention of the motorized vehicle the need was identified for a means for a driver to see if other objects were in the rearward vicinity of the driver's vehicle. To this end rear view mirrors have been installed both inside the vehicle and outside the vehicle. Currently most automobiles have external rear view mirrors located at the bottom forward corner of the side window of the vehicle.

A common problem that drivers experience when looking at the driver side rear view mirror is that there is a space which extends roughly between the rear of the driver's car and the driver's door where the rear view mirror does not pick up another vehicle or object completely. This location is commonly known as the blind spot. A number of products are available in the marketplace that attempt to solve the problem of the blind spot. With regard to the driver's side external rear view mirror, some manufacturers are marketing small, spherically convex mirrors which attach to the existing rear view mirror of the vehicle and afford the driver a wider angle of view with respect to what can be seen to the side and rear of the vehicle. The problem with all of current designs of these mirrors is that they can be confusing in that the driver is looking at the normal rear view mirror and then also looking at the small convex mirror from time to time. The convex mirror makes objects look further away than they really are. Because the driver is looking at both mirrors it can be confusing to determine which view is accurate. Additionally, the add-on blind spot mirrors currently available are quite small, approximately one and one half inches square or round, and therefore the driver has to make a conscious effort to look for moving objects in this small mirror.

SUMMARY OF THE INVENTION

The primary object of the invention is to provide an improved blind spot mirror for motor vehicles that attaches to an existing, externally mounted drivers side rear view mirror.

Another object of the invention is to provide an improved blind spot mirror for motor vehicles that causes the driver to see a wider angle of viewing, yet does not make vehicles appear further away than they really are.

A further object of the invention is to provide a blind spot mirror that has an extension member attached to the rear surface of the mirror so that the blind spot mirror can be larger than the original rear view mirror and yet not interfere with the original rear view mirror's frame.

Other objects and advantages of the present invention will become apparent from the following descriptions, taken in connection with the accompanying drawings, wherein, by way of illustration and example, an embodiment of the present invention is disclosed.

A vehicle blind spot mirror comprising: a mirror having a single plane outwardly curved surface, an extension member attached to the rear portion of said curved mirror having a double stick foam tape attachment means on the opposite surface of said extension means allowing said blind spot mirror and said extension to be attached to a vehicle's existing rear view mirror even if said rear view mirror is set in a recessed frame thereby allowing for a larger said blind spot mirror than said existing rear view mirror. Since the blind spot mirror is curved in the vertical plane only, objects seen in the mirror appear a little thinner, but not further away than in a conventional rear view mirror.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
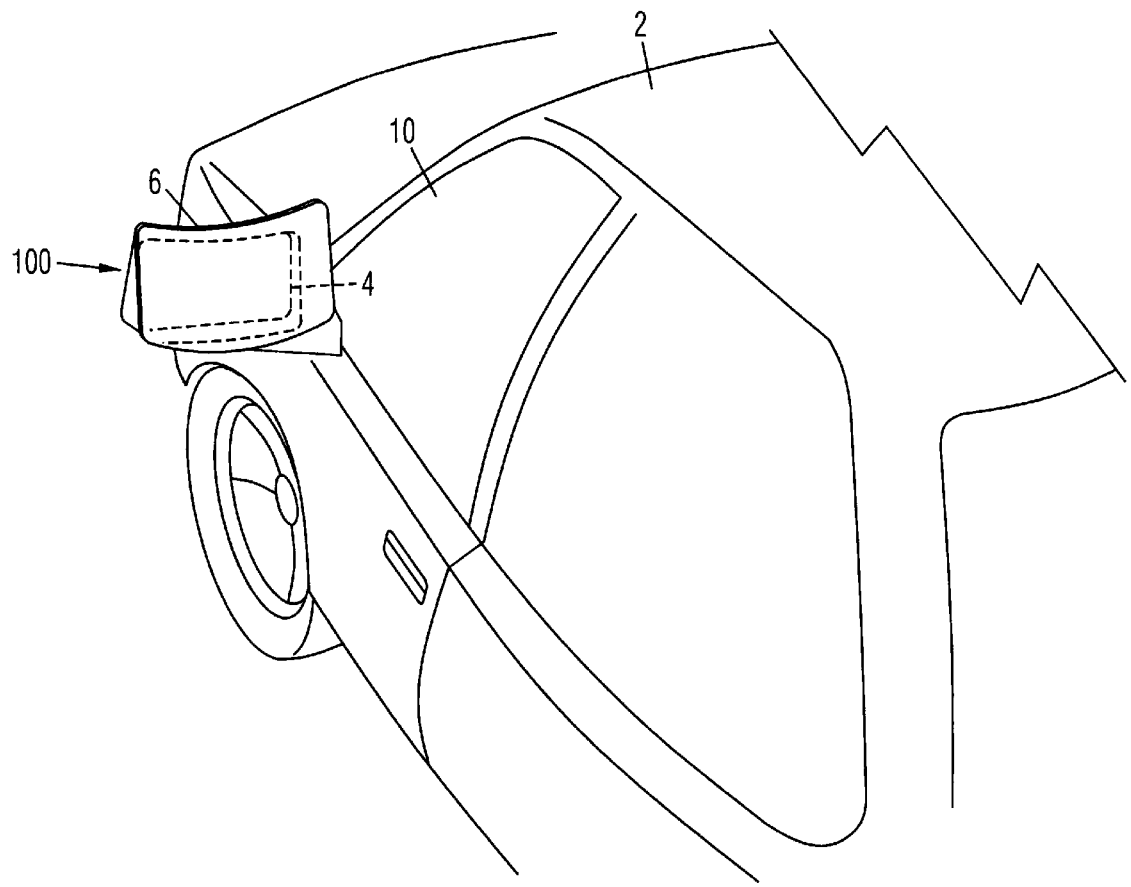
FIG. 1 is a perspective view of the present invention mounted to an existing rear view mirror

Referring now to FIG. 1 we see the blind spot mirror device of the present invention 100 in its attached mode to a standard driver's side rear view mirror 4 as found on most motor vehicles, in this case, an automobile 2. Note that the mirror 6 is outwardly curved. This configuration allows a driver to see a wider field of view than a conventional flat rear view mirror. Blind spot mirrors that are meant to be added onto the front surface of an existing rear view mirror are in the market place today however they are spherically convex in shape and appear to show objects further away than they really are because the spherical convexity makes them appear smaller than as seen in a flat mirror. The present mirror 6 however is curved in only one vertical plane and therefore makes objects appear thinner than as seen in a flat rear view mirror but not necessarily smaller or further away.

Additionally, mirror 6 of the present invention is having dimensions at vertical direction and horizontal direction, wherein said mirror sized for being substantially wider in both of said vertical and horizontal directions than a frame of a conventional rear view mirror and can be placed closer to the driver's side window, thereby giving the driver a clearer view of objects that may be closely adjacent to the rear portion of the driver's side of the vehicle.

Figure 2:
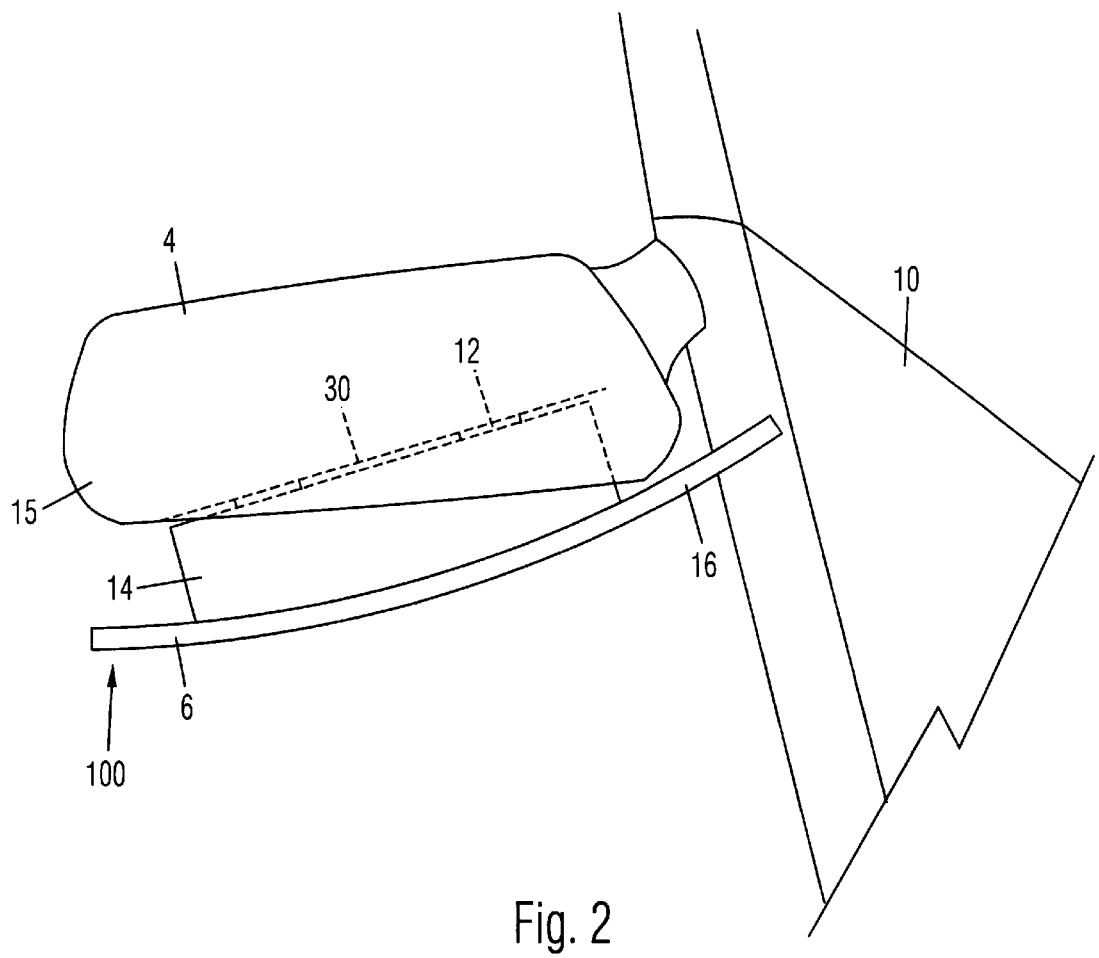
FIG. 2 is a top view of the present invention mounted to an existing rear view mirror.

Referring now to FIG. 2 we see a top view of the present invention 100. Double sided foam tape 12 adheres the blind spot mirror device 100 to a mirror 30 of the conventional driver's side rear view mirror assembly 4. Extension block 14 allows mirror 6 to be larger than the mirror 30 because it extends far enough out so as to clear the frame 15 of the existing rear view mirror. It also allows blind spot mirror 6 to extend 16 so that it is close to the side window 10 of the vehicle, thereby improving the driver's view of objects which may be closely adjacent to the rear side portion of the vehicle.

Figure 3:
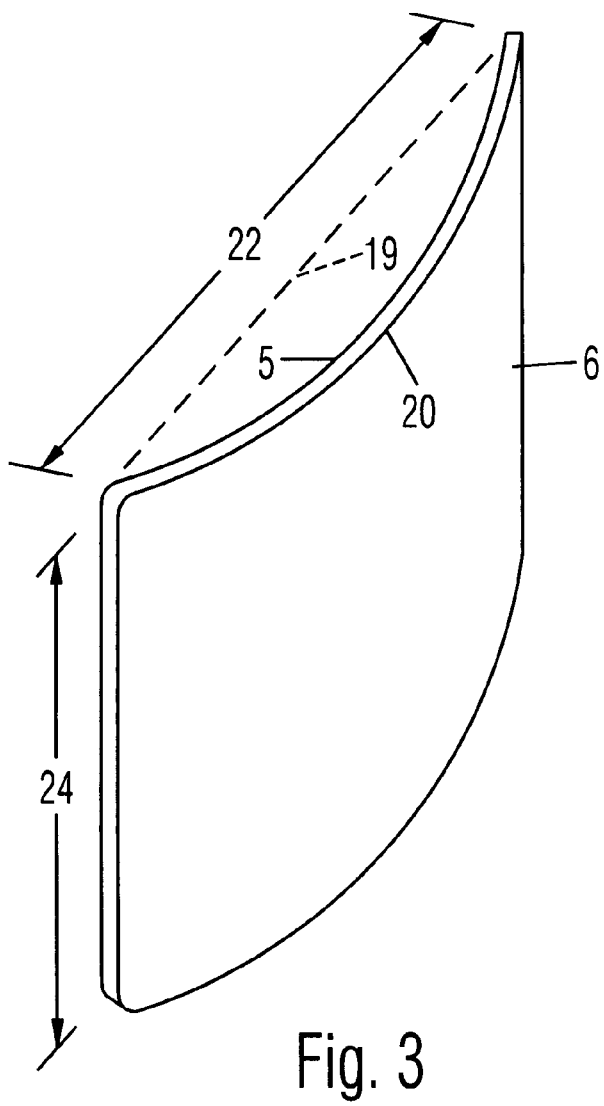
FIG. 3 is a perspective view of the radially curved rear view mirror of the present invention.

FIG. 3 shows a perspective view of the mirror 6 of the present invention. My experiments have shown that too severe a curve in mirror 6 gives too distorted a view of objects seen in the mirror 6, and not enough of a curve makes the mirror 6 less effective in seeing the blind spot. The ideal height of the apex of the curve as measured from the rear 5 of the center of mirror 6 to an imaginary flat plane 19 is between a minimum of thirty thousandths of an inch to a maximum of approximately eighty thousandths of an inch as indicated by reference arrows 20. These dimensions hold true assuming that the overall width of mirror 6 is approximately seven and one half inches as indicated by dimensions arrows 22. For reference, the ideal height of mirror 6 is approximately five inches as indicated by dimension arrows 24.

As the above drawings and description of drawings show, the vehicle blind spot mirror of the present invention is an improved device for aiding driver's in seeing all objects that may be in close proximity to the rear and side of the driver's side of the vehicle. The view of objects can be seen, with the present invention, without interruption as those objects advance toward the drivers vehicle, whereas the same objects may not be seen when looking at those same objects in a conventional rear view mirror.

Although the above embodiment shows the present invention as an add-on to an existing rear view mirror, it is to be understood that the above described mirror 6 could be used in place of the standard flat rear view mirror and still fall within the claims of the present invention. It should be noted that a spherically convex mirror is externally positioned on the passenger side of many vehicles, however these mirrors also make objects appear further away than they really are, whereas the mirror of the present invention makes objects appear thinner than they are but not necessarily further away.

Although small, spherically convex add on type blind spot mirrors currently exist for solving the blind spot problem, they are inferior to the present design because they make objects appear further away than normal and because they are affixed to a small portion of the existing rear view mirror causing the driver to have to perform the confusing task of interpreting two different views of the same objects at the same time.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A vehicle blind spot mirror device, comprising:

a mirror having dimensions at vertical direction and horizontal direction, wherein said mirror sized for being substantially wider in both of said vertical and horizontal directions than a frame of a conventional rear view mirror assembly on an automobile on an automobile for improved blind spot viewing; and an extension block attached to a rear side of said mirror and projecting substantially behind said mirror, a rear side of said extension block for attaching to said a mirror of said conventional rear view mirror assembly;

said extension block being thick enough to hold said mirror in a position for being entirely outside said frame of said conventional rear view mirror assembly.

2. A vehicle blind spot mirror device, comprising:

a convex mirror having dimensions at vertical direction and horizontal direction, wherein said mirror sized for being substantially wider in both of said vertical and horizontal directions than a frame of a conventional rear view mirror assembly on an automobile for improved blind spot viewing; and said mirror curved along said horizontal direction and straight along said vertical direction for making objects therein thinner but generally not smaller and generally not further away than said objects would appear in a conventional flat mirror;

an extension block attached to a rear side of said mirror and projecting substantially behind said mirror, a rear side of said extension block for attaching to said a mirror of said conventional rear view mirror assembly;

said extension block being thick enough to hold said mirror in a position for being entirely outside said frame of said conventional rear view mirror assembly.

3. The vehicle blind spot mirror device of claim 2, wherein said mirror is about 7.5 inches wide, an apex of said mirror being spaced about 0.03 inch to about 0.08 inch from an imaginary straight line between left and right edges of said mirror for balancing distortion and blind spot viewing effectiveness.

* * * * *